United States Patent [19]

Beshay

[11] Patent Number: 4,717,742

[45] Date of Patent: Jan. 5, 1988

[54] REINFORCED POLYMER COMPOSITES WITH WOOD FIBERS GRAFTED WITH SILANES - GRAFTING OF CELLULOSES OR LIGNOCELLULOSES WITH SILANES TO REINFORCE THE POLYMER COMPOSITES

[76] Inventor: Alphons D. Beshay, 3595 de Courval, Trois Rivieres, Quebec, Canada, G8Z 1S8

[21] Appl. No.: 739,469

[22] Filed: May 29, 1985

[51] Int. Cl.$^4$ .............................................. C08K 9/06
[52] U.S. Cl. ..................... 523/203; 523/212; 523/213; 524/13; 524/35; 524/583; 524/586
[58] Field of Search .................. 523/212, 213, 203; 524/13, 35

[56] References Cited

U.S. PATENT DOCUMENTS

| | | | |
|---|---|---|---|
| 4,317,765 | 3/1982 | Gaylord | 523/209 |
| 4,327,001 | 4/1982 | West et al. | 524/322 |
| 4,338,228 | 7/1982 | Inoue et al. | 524/305 |
| 4,349,605 | 9/1982 | Biggs et al. | 524/229 |
| 4,395,496 | 7/1983 | Wittmann et al. | 523/107 |
| 4,409,345 | 10/1983 | Moteki et al. | 524/13 |
| 4,442,243 | 4/1984 | Woodhams | 523/212 |

FOREIGN PATENT DOCUMENTS

| | | | |
|---|---|---|---|
| 0008143 | 2/1980 | European Pat. Off. | 524/35 |
| 0061052 | 4/1982 | Japan | 523/212 |
| 0172940 | 10/1982 | Japan | 523/212 |
| 0172941 | 10/1982 | Japan | 523/203 |
| 0192446 | 11/1982 | Japan | 524/13 |
| 0011537 | 1/1983 | Japan | 524/13 |
| 0136636 | 8/1983 | Japan | 523/212 |
| 0217744 | 12/1984 | Japan | 524/13 |

*Primary Examiner*—Herbert J. Lilling

[57] ABSTRACT

Silanes grafted onto celluloses and lignocelluloses' fibers, in presence of free radical initiator, reinforced thermoplastic composites, which replace the inorganic fillers. Polyethylene composites are prepared by a hot melt mixing process, wherein the cellulosic molecules graft with silanes, and part of the thermoplastic polymer, can be initiated to attach with the maleic anhydride present. The grafted cellulose molecules with aminosilanes combine easily and strongly with that maleiated polymer to give the superior composite properties. The silanes grafted onto organic fillers proved to be higher in energy, secant modulus, tensile strength and strain compared to inorganic fillers such as glass fibers or mica composites. Noting that the cost of silanes grafted onto cellulosic or lignocellulosic fibers are several times lower than that of treated glass fibers or mica.

7 Claims, No Drawings

REINFORCED POLYMER COMPOSITES WITH WOOD FIBERS GRAFTED WITH SILANES - GRAFTING OF CELLULOSES OR LIGNOCELLULOSES WITH SILANES TO REINFORCE THE POLYMER COMPOSITES

This invention relates to thermoplastic composites reinforced with silanes grafted onto organic fillers and methods for their preparation. More specifically, it relates to such reinforced thermoplastic composites, which have improved strength, moduling, strain and energy at peak for polyethylene and at break for polyproplylene; and improved methods of application on other thermoplastic polymers filled with other celluloses and lignocelluloses fibers.

It is known to prepare composites, which consist essentially of thermosetting or thermoplastic resinous matrix materials having therein dispersed organic reinforced fillers, such as cellulosic or lignocellulosic fibers.

Organic and/or inorganic fillers are described, for example, in U.S. Pat. No. 3,645,939 Norman G. Gaylord et al, issued in Feb. 29, 1972, and France Pat. No. 76, 34301 Tomas Avello Show et al. The U.S. Pat. No. 3,645,939 teaches that composites are prepared from a material containing hydroxyl groups, such as cellulose, starch, polyvinyl alcohol, sand, metal or glass and thermoplastic material containing labile atoms, such as polyethylene polyvinylchloride, by reacting the materials with a coupling agent such as maleic anhydride, in the presence of a free radical initiator. An improved method for incorporating fillers or reinforcing agents into thermoplastic polymers is also provided by precoating the filler or reinforcing agent with a thermoplastic material containing labile atoms in the presence of a coupling agent and a free radical initiator. The France Pat. No. 76, 34301, issued in Nov. 15, 1976, can be adjustifying the preparation of a new material, property of which can be adjusted to adaptation of different applications, which can be formed by a copolymer or a lignocellulosic material and is bound to a polymer by grafting in a manner that can play a reinforcement role to the polymer, in replacement of mineral fibers such as fiber glass, which is highly expensive. The invention has also, as an object, a process for preparation of copolymer wood-material plastic, characters of which consist essentially of making at least an unsaturated ethylenic monomer react with a ligno-cellulosic material in a watery medium and in presence of a polymerisation catalyst of peroxides' type, at a temperature higher than the temperature for decomposition of catalyst, in a way to cause the polymerisation of monomer and its grafting on the lignocellulosic material.

It has been found that resin composites reinforced with silanes grafted onto organic fillers have improved their durability, even at sub-zero degrees or at high temperatures, physical properties and can be prepared by a process, inwhich the organic filler was grafted with silane coupling agent in maleiated polymer matrix. Not only have the physical properties (tensile strength, strain, modulous and energy) and durability of the composites of the present invention improved, but also the composites can be re-ground and re-molded to give molded materials exhibiting slightly if there is any deterioration in physical properties. Furthermore, the surface finish of molded parts from composites of the present invention is smooth, uniform and glassy. The specimens are pale in colour and light translucent.

Thus, according to one aspect of this invention, there is provided a reinforced thermoplastic resin composite comprising a high molecular weight thermoplastic polymeric matrix material reinforced with silanes grafted onto cellulosic or lignocellulosic filler materials, said filler comprising from 10 to 40 weight percent of the total composite.

This invention has been primarily developed, and shows its most useful application, with polyethylene&isotactic polypropylene matrix materials reinforced with silanes grafted onto wood pulps or wood flour, in presence of maleic anhydride, it will be more specifically described herebelow in details, regarding linear low density polyethylene—wood pulp and linear low density polyethylene—wood flour composites. However, the invention is not limited to such materials. It shows advantages when used with any kind of silanes in grafting with any kind of cellulosic or lignocellulosic fillers, such as cotton linters, wood pulps, kraft pulps, wood flours, starch, or any cellulosic or ligno-cellulosic fillers mixed with inorganic fillers such as clay, calcium carbonate, fiber glass, mica, talc . . . etc., or mixed with powdered metals as iron, aluminium . . . etc. Also for preparation of composites in conjunction, these silanes grafted fillers with other polyolefin resins containing labile atoms, for example polystyrene, polyvinyl chloride, polymethylmethacrylate, polyethylene partially containing carbon or anyother copolymers or rubbers and the like. The free radical initiator may be other initiator, for example dicumylperoxide, ditertiary butyl peroxide, hydrogen peroxide . . . etc. The maleic anhydride coupling agent may be changed with succinic anhydride, or any acid anhydride and the like.

Silanes grafted onto hydrophilic cellulosic or lignocellulosic fibers of this invention gave a chance for wrapping and bonding of these fibers with the hydrophobic polymer. The percentages of silanes added were 1-2 or 1-4 (filler weight percent) of A-1100 or A-174 (Union Carbide), respectively. The presence of maleic anhydride leads to formation of little part of maleiated polymer by the effect of the free radical initiator present and of the heat melt of the plymer. The weight percentage of maleic anhydride was 1% of the used fibers. The free radical initiator was 0.8% filler weight, which acts to initiate the hydroxylic cellulosic functional groups, part of the heat melt polymer matrix, the maleic anhydride present and may eleminate the ethoxyl or methoxyl groups on silanes molecules to be grafted onto the initiated cellulosic molecules of the filler. This takes place during the melt mixing on the roll mill or extruder. Furthermore, the oxygen atoms of the maleiated polymer attach to some of the hydrogen atoms of cellulosic hydroxylic functional groups through the formation of hydrogen bonding (U.S. Pat. No. 3,645,939). The superior mechanical properties in this invention were achieved by grafting 2% filler weight of gamma-aminopropyltriethoxysilane (A-1100) onto dry chemicalthermomechanical aspen wood pulp ground at mesh size 60. These may due to its further combination with oxygen atoms of the maleiated polymer and with the silane amino functional group by eleminating water molecule, Woodhams (U.S. Pat. No. 4,442,243).

Some aspects of this invention, during its preparation, are of easy technic, time and energy saving and of no waste of chemicals. In a further embodiment, the organic filler used of the present invention for preparing composites, have low cost economy, light weight, less machinewear, no health hazard and renewable nature.

The chemithermomechanical pulp of aspen or birch used as an example of this invention were prepared in a Sund Defibrator under the conditions listed in Table 1.

Linear low density polyethylene, Navopol LLGR-0534-A, was supplied by NOVACOR CHEMICALS LTD. Reported properties of that polyethylene are as follows: melt index: 5 g/10 min; density: 934 kg/m$^3$.

Isotactic-polypropylene was supplied by HERCULES CANADA (PRODUCT 6331). Reported properties of that polypropylene are as follows: $\overline{Mn}$=38,000: approximate value; $\overline{Mw}$=290,000: approximate value.

Benzoyl peroxide was supplied by ANACHEMIA (AC-1100).

Maleic anhydride was supplied by ANACHEMIA (AC-5583).

Mica-200-NP-Suzorite (200 mesh, coated) was supplied by MARIETTA CO., Montreal.

Glass fibers 731 BA 1/32 (0.8 mm, coated) were supplied by FIBER GLASS of Canada via MIA CHEMICAL, Montreal.

Silanes were supplied by UNION CARBIDE COMPANY, Montreal:

i. Gamma—Methacryloxy—Propyltrimethoxy Silane

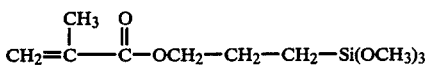

known as A-174 ii. Gamma—Amino Propyl Triethoxy Silane

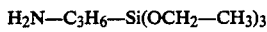

known as A-1100

In the method of preparation according to the present invention, the acetone dispersed the silane, maleic anhydride and benzoyl peroxide on the surface of the filler particles. 30% of the polymer was added to melt first on the hot roll mill. The remaining 70% of the polymer were then mixed with the homogenized filler by using a blender and was added later on to the roll mill. Temperature conditions, agitation, time etc . . . should be chosen so as to ensure production of intimate, uniform dispersion, without causing thermal or mechanical degradation of the polymer. The mixture should also contain appropriate antioxidants and metal scavenging compounds, to enhance its stability.

An alternative method of preparation involves grafting of cellulosic filler in a flask for 3–4 hours' reflux with 1–4% filler weight of silane and 0.8% filler weight of free radical initiator in a solvent compatible to the polymer used. Another 5% filler weight of polymer, 2% filler weight maleic anhydride and 1% polymer weight free radical initiator were all refluxed in a second flask for 3–4 hours. The first flask contents were then added to that of the second flask and the reflux continued for another 1–2 hours, then cooled to room temperature. The solvent was evaporated by air wind current, dried at 105° C. in an air circulated oven for two hours and ground at mesh 60.

The present invention contemplates the use of any and all types of cellulosic and lignocellulosic fibers. The benefits of the invention can be obtained with any of the various currently available celluloses and lignocelluloses. It is not only a very significant advantage of the present invention to use the organic fillers because of their lower cost, renewable nature, no health hazard and light weight, but also realised higher results of mechanical properties.

One of the aspects of this invention shows that the prepared composites proved to have superior stability under extreme temperature conditions comparing to composites filled with fiber glass or mica.

The proportion of silane grafted onto organic fillers, used in the present invention for reinforcement of thermoplastic polymers, directly affects the mechanical properties. From an economic point of view, it is desirable to have as high a content of silane grafted onto organic filler in the composite as consistent with desirable physical properties.

The following examples illustrate the best modes contemplated for carrying out this invention. The measurements were at peak for linear low density polyethylene composites and at break for isotactic polypropylene.

EXAMPLE I

Grafting of silane A-1100 onto chemicalthermomechanical aspen pulp by solvent reflux method 20 g of dried aspen pulp were placed in a rounded bottom (500 ml capacity) flask, then covered with 200–250 ml of p-xylene as solvent; 0.16 g benzoyl peroxide was added to the flask as free radical initiator. 0.4–0.6 g (pulp weight percent) of Gamma-Aminopropyltriethoxy silane (A-1100) were added to the flask contents and were subjected to reflux for 3–4 hours, then left to cool down to room temperature while stirring continuously.

EXAMPLE II

Preparation of maleiated polymer

Quantities of 1.4 g of linear low density polyethylene or isotactic polypropylene, 0.7 g of maleic anhydride, 0.017 g of benzoyl peroxide and 150 ml of p-xylene were added together in another rounded bottom flask of one liter capacity, and were subjected to reflux while stirring for 3–4 hours and then were left to cool down till about 90° C.

EXAMPLE III

Coupling of silane grafted pulp with maleiated polymer

The contents of flask of example I. were added to those of flask of example II. Reflux continued for 1–2 hours while stirring for coupling the hydrophobic maleiated polymer with the grafted hydrophilic pulp. The contents were left to cool down to room temperature. All grafted contents of pulp were collected in a glass dish and were subjected to air wind for 4–5 hours, finely divided and kept at 105° C. in a circulated air oven for another 3 hours and then ground at mesh 60 by using a grinder.

EXAMPLE IV

Preparing a mixture of aspen pulp filler with silane A-174 to graft on the hot roll mill in presence of linear low density polyethylene 20 g of dry and ground at mesh 60 of chemicalthermomechanical aspen wood pulp were placed in a beaker of 500 ml capacity. A mixture of 0.16 g benzoyl peroxide, 0.2 g maleic anhydride and 0.2, 0.4 or 0.8 g of silane A-174 were well dissolved together in 15 ml acetone and were added drop by drop to the stirred aspen pulp.

The stirring continued for another 30 minutes. The beaker contents were then subjected to air wind for 2-3 hours to dry. 30% of linear low density polyethylene were added to be melted first on the hot roll mill (140° C.). The remaining 70% of the polymer, previously mixed with the homogenized mixture of silane aspen pulp, by using a blender, and were added later on to the roll mill. All composite quantity was collected and remixed on the roll mill every half minute for 20 minutes duration, then the melted composite was collected to cool down to room temperature.

EXAMPLE V

Preparing a mixture of aspen pulp filler with silane A-1100 to graft on the hot roll mill in presence of linear low density polyethylene The same procedure as in example IV, but by substituting silane A-174 with silane A-1100.

EXAMPLE VI

Preparation of injection molded specimens

Mixing of polymer and grafted fibers (examples I–III) were performed on Roll Mill, C. W. Brabender Laboratory Prep. Mill, No. 065. Usually 15 to 20 grams of polymer were mixed with fibers at temperatures from 150° to 155° C., the resulting mixture collected and re-mixed 20 times, then allowed to cool down to room temperature and ground to mesh size 20.

The above prepared polymer-fiber mixture was molded into the shoulder type test specimens, (6-24 at the same time), in a mold, which was covered by metal plates on both sides.

The weight of material for one specimen was 0.9 g when molded at a temperature of 155.5° C. for 15 minutes at a pressure of 3.8 MPa. The starting temperature was 93.3° C. and cooling time was 15 minutes.

EXAMPLE VII

The use of different solvents

A slight difference occurred in the mechanical properties of the prepared composites when using solvents other than p-xylene as mentioned in example I, such as carbontetrachloride or benzene ... etc. In case of applying these solvents, they will be evaporated by exposition to air wind; at the same time the p-xylene volume will be increased to 300 ml as mentioned in example II.

EXAMPLE VIII

Treatment of aspen wood pulp with silane (A-174) or (A-1100) in absence of initiator 0.8 g of silane A-174, or silane A-1100, was dissolved in 15 ml of ethanol (90%) and was added by droplets for 5 minutes to 20 g of aspen wood pulp (mesh size 60) while stirring for 10 minutes. After this addition, stirring continued for another 20 minutes. The mixture was left at 105° C. in a circulated air oven for 2 hours before being mixed with the polymer on the roll mill.

EXAMPLE IX

Effect of maleic anhydride on aspen wood pulp in absence of silanes

Same procedure as in example IV, or V, but in absence of silanes.

EXAMPLE X

Mechanical measurements of the prepared composite samples

Dimensions of all samples were measured with a micrometer. All experimental data reported is an average of at least four measurements. Mechanical measurements of samples were made on an Instron tester (Model 4201) at room temperature. Full scale load was 500 N; extensometer was not fitted, gauge length 17 mm, crosshead speed 10 mm/min. and modulus origin 5N. Statistics were automatically calculated by HP86B, using the Instron 2412005 General Tensile Test programme. The secant modulus was evaluated from origin to load 80N. Average coefficients of variation for mechanical properties were as follows: stress: 3.3%; strain: 4.9%; energy 8.3%; modulus: 2.3%.

EXAMPLE XI

According to the procedures described in previous examples, the grafted lignocellulosic fibers reinforced polyethylene or polypropylene composites. As for the present invention, the composites comprised of variable amounts of grafted fibers ranging from 0 to 40 parts in a 100 parts of polymer.

In each case, the dried ungrafted chemicalthermomechanical aspen, or birch wood pulp, mesh size 60, was added to the polymers as in example VI. The tested samples according to example X gave the following results as per Tables II. & III.

TABLE I.

CONDITIONS OF THE PREPARATION AND PROPERTIES OF BIRCH AND ASPEN WOOD PULP

| COOKING CONDITIONS | BIRCH | ASPEN | PROPERTIES | BIRCH | ASPEN |
| --- | --- | --- | --- | --- | --- |
| Temperature Max. (°C.) | 126 | 126 | Drainage index (CSF), ml | 117 | 119 |
| Retention time (min) | 5 | 5 | Brightness, Elrepho (%) | 55.7 | 60.9 |
| Pressure (psig) | 20 | 20 | Opacity, (%) | 94.1 | 91.4 |
| $Na_2SO_3$ (%/Dry wood) | 5 | 5 | Breaking length, km | 4.22 | 4.46 |
| NaOH (%/Dry wood) | 5 | 5 | Elongation (%) | 1.79 | 1.79 |
| pH | 12.9 | 12.9 | Tear index, $mN \cdot m^2/g$ | 6.08 | 7.20 |
| Consistence during refining, % | 21.8 | 23.9 | Burst, index, $kPa \cdot m^2/g$ | 1.88 | 2.59 |
| Refining energy, MJ/kg | 5.26 | 5.15 | Yield (%) | 90.0 | 92.0 |
| Refiner output, kg/h | 46.8 | 45.6 | Kappa index No | 128.0 | 121.7 |
|  |  |  | Lignin % | 18.8 | 17.9 |

TABLE II.

COMPOSITES OF UNGRAFTED WOOD PULPS WITH LINEAR LOW DENSITY POLYETHYLENE

| | Experiment | | | | | | | | | | | | | | | |
|---|---|---|---|---|---|---|---|---|---|---|---|---|---|---|---|---|
| | Energy (KJ) × $10^5$ | | | | Strain (%) | | | | Stress (MPa) | | | | Modulus (MPa) | | | |
| Fibers (wt %) | 10 | 20 | 30 | 40 | 10 | 20 | 30 | 40 | 10 | 20 | 30 | 40 | 10 | 20 | 30 | 40 |
| Aspen (CTMP)* (Mesh 60) | 1.5 | 15.4 | 8.4 | 8.3 | 8.2 | 5.9 | 4.1 | 3.4 | 12.6 | 15.2 | 18.4 | 17.6 | 90 | 152 | 262 | 467 |
| Birch (CTMP) | 9.6 | 10.9 | 5.0 | 2.7 | 9.4 | 5.9 | 5.3 | 3.9 | 12.5 | 17.6 | 18.8 | 17.1 | 148.5 | 226 | 208.8 | 255.2 |
| Linear low density polyethylene (LLDPE) | | 20.4 | | | | 20.3 | | | | 14.8 | | | | 43.5 | | |

*Chemicalthermomechanical pulp = CTMP

TABLE III.

UNGRAFTED ASPEN PULP POLYPROPYLENE COMPOSITES

| MECHANICAL PROPERTIES | POLYPROPYLENE | ASPEN PULP-POLYPROPYLENE COMPOSITES | | | |
|---|---|---|---|---|---|
| | (PP) | 10% | 20% | 30% | 40% |
| Modulus (MPa) | 104.8 | 197.9 | 267.7 | 312.5 | 374.8 |
| Stress (MPa) | 29.5 | 30.3 | 23.0 | 23.5 | 26.5 |
| Energy (Kj/m²) | 77.9 | 43.8 | 10.9 | 8.9 | 9.3 |
| Strain % | 0.0165 | 0.009 | 0.005 | 0.0044 | 0.0041 |

It may be seen from these results that there is no significant increase in mechanical properties in the ungrafted aspen or birch pulp-polyethylene composites, Table II, or ungrafted aspen pulp-polypropylene composites, Table III.

EXAMPLE XII

The effects of variable percentages of silane A-1100 grafted on aspen wood pulp coupling with maleiated polyethylene, as per examples I–III, are shown on Tables IV for polyethylene composites and V for polypropylene composites.

It is noticiable from these Tables that the aspen wood pulp grafted with silane A-1100 highly improved the composites' mechanical properties of both polyethylene and polypropylene, pages 15 & 16.

EXAMPLE XIII

Table No. VI explains the effect of treating aspen wood pulp by silanes A-1100 and A-174, in absence of free radical initiator on polyethylene composites as explained in example No. VIII, page 17.

TABLE IV.

COMPOSITES OF GRAFTED ASPEN FIBERS

Experimentally *Grafted Aspen Pulp with Silanes A-1100

| Concentration (Wt %) | Energy (KJ) × $10^5$ | | | | Strain (%) | | | | Stress (MPa) | | | | Modulus (MPa) | | | |
|---|---|---|---|---|---|---|---|---|---|---|---|---|---|---|---|---|
| | 10 | 20 | 30 | 40 | 10 | 20 | 30 | 40 | 10 | 20 | 30 | 40 | 10 | 20 | 30 | 40 |
| 1% | 19.5 | 22.1 | 26.7 | 27.7 | 24.3 | 23.7 | 22.7 | 19.2 | 17.4 | 19.3 | 20.8 | 21.4 | 56.8 | 63.04 | 67.9 | 69.9 |
| 2% | 22.1 | 27.4 | 31.7 | 34.3 | 23.5 | 22.9 | 21.05 | 18.5 | 18.7 | 21.4 | 22.2 | 22.7 | 46.8 | 61.4 | 73.2 | 72.5 |
| 3% | 31.0 | 40.9 | 41.5 | 42.4 | 23.6 | 23.1 | 20.1 | 18.0 | 20.6 | 23.2 | 26.8 | 34.9 | 67.1 | 75.7 | 87.8 | 114.1 |
| LLDPE | | 20.4 | | | | 20.3 | | | | 14.8 | | | | 43.5 | | |

*5% of polyethylene addition

TABLE V.

MECHANICAL PROPERTIES OF GRAFTED ASPEN PULP WITH SILANE A-1100 - POLYPROPYLENE COMPOSITES

| MECHANICAL PROPERTIES | POLYPROPYLENE | ASPEN PULP-POLYPROPYLENE COMPOSITES | | | |
|---|---|---|---|---|---|
| | (PP) | 10% | 20% | 30% | 40% |
| Modulus (MPa) | 104.8 | 228.0 | 352.9 | 356.3 | 385.0 |
| Stress (MPa) | 29.5 | 30.5 | 33.3 | 27.8 | 30.7 |
| Energy (Kj/m²) | 77.9 | 27.1 | 18.7 | 11.0 | 10.6 |

TABLE VI.

COMPOSITES OF SILANE TREATED ASPEN PULPS

| ASPEN Mesh 60 (Wt %) | ENERGY (KJ) × $10^5$ | | | | STRAIN (%) | | | | STRESS (MPa) | | | | MODULUS (MPa) | | | |
|---|---|---|---|---|---|---|---|---|---|---|---|---|---|---|---|---|
| | 10 | 20 | 30 | 40 | 10 | 20 | 30 | 40 | 10 | 20 | 30 | 40 | 10 | 20 | 30 | 40 |
| 4% Silane A-1100 | 12.3 | 13.3 | 11.8 | 9.64 | 14.1 | 12.4 | 11.4 | 7.1 | 15.6 | 17.7 | 18.4 | 19.7 | 65.0 | 84.3 | 95 | 164.2 |
| 4% Silane A-174 | 13.8 | 15.2 | 12.7 | 10.4 | 15.1 | 14.4 | 12.4 | 11.7 | 17.8 | 19.8 | 20.3 | 24.7 | 68.5 | 94.2 | 96.7 | 123.5 |
| LLDPE | | 20.4 | | | | 20.3 | | | | 14.8 | | | | 43.5 | | |

EXAMPLE XIV

Table VII indicates the mechanical properties of polyethylene composites filled with aspen pulp maleic anhydride treated, as explained in example IX.

TABLE VII.

| TREATED ASPEN PULP (Wt %) | Tensile strength (MPa) | Strain % | Energy J × $10^2$ | Modulus (MPa) |
|---|---|---|---|---|
| 0 | 14.8 | 20.3 | 20.4 | 43.5 |
| 10 | 17.1 | 19.9 | 22.6 | 45.5 |

TABLE VII.-continued

| TREATED ASPEN PULP (Wt %) | Tensile strength (MPa) | Strain % | Energy J × 10² | Modulus (MPa) |
| --- | --- | --- | --- | --- |
| 20 | 18.9 | 14.2 | 31.5 | 70.8 |
| 30 | 22.9 | 9.2 | 36.5 | 132.7 |
| 40 | 26.3 | 7.7 | 32.2 | 181.4 |

Some improvements appeared when aspen pulp treated with maleic anhydride, in presence of free radical initiator. This slight improvement of tensile strength, energy & modulus is due to the effect of maleic anhydride coupling agent as indicated in U.S. Pat. No. 3,645,939.

EXAMPLE XV

The mechaical results of polyethylene composites filled with aspen wood pulp grafted with silane A-174, as explained in example no. IV., are tabulated on Table VIII.

TABLE VIII.

| | Grafted Aspen Wood Pulp with Silane A-174 (Wt %) | | | | | | | | | | | |
| --- | --- | --- | --- | --- | --- | --- | --- | --- | --- | --- | --- | --- |
| Concentration | Stress (MPa) | | | Strain % | | | Energy J × 10² | | | Modulus (MPa) | | |
| of Silane | 20 | 30 | 40 | 20 | 30 | 40 | 20 | 30 | 40 | 20 | 30 | 40 |
| 1% | 20.1 | 24.7 | 26.8 | 20.2 | 19.9 | 18.0 | 32.1 | 36.3 | 30.8 | 290.0 | 380.1 | 412.5 |
| 2% | 20.5 | 25.1 | 28.2 | 25.3 | 24.1 | 17.8 | 36.4 | 42.3 | 40.1 | 298.7 | 306.2 | 424.0 |
| 4% | 21.8 | 26.9 | 30.2 | 26.1 | 24.4 | 18.9 | 39.7 | 50.8 | 43.9 | 391.5 | 414.0 | 457.34 |
| LLDPE | | 14.8 | | | 20.3 | | | 20.4 | | | 43.5 | |

The energy has improved by more than 240% at 30% of filler compared to energy of linear low density polyethylene, while at 40% filler it was more than 200%. This strongly indicates a dramatic improvement of interphase bonding in grafted aspen-polyethylene composites with silane A-174. The improvement of stress by 200% can also be explained by interface adhesion in the composite.

An even more interesting "side effect" of grafting is the improvement (or non-deterioration) of strain of grafted aspen pulp, which was improved by 120%.

The secant modulus was improved by 1000% comparing with polyethylene modulus. The best mechanical properties of grafted aspen pulp with silane A-174 were achieved by 4% silane A-174 concentration.

EXAMPLE XVI

The mechanical results of polyethylene composites filled with aspen wood pulp grafted with silane A-1100, which embody the present invention, as explained in example no. V., are tabulated on Table IX.

TABLE IX.

| | Grafted Aspen Wood Pulp with Silane A-1100 (Wt %) | | | | | | | | | | | |
| --- | --- | --- | --- | --- | --- | --- | --- | --- | --- | --- | --- | --- |
| Concentration | Stress (MPa) | | | Strain % | | | Energy J × 10² | | | Modulus (MPa) | | |
| of Silane | 20 | 30 | 40 | 20 | 30 | 40 | 20 | 30 | 40 | 20 | 30 | 40 |
| 1% | 22.4 | 25.1 | 26.0 | 17.3 | 14.7 | 13.9 | 35.0 | 37.0 | 36.8 | 344.7 | 386.0 | 400.0 |
| 2% | 25.9 | 28.6 | 31.4 | 28.6 | 25.6 | 20.4 | 51.3 | 55.9 | 50.4 | 336.9 | 372.0 | 506.0 |
| 3% | 23.7 | 27.1 | 31.2 | 25.4 | 23.5 | 18.7 | 42.1 | 48.0 | 43.6 | 349.1 | 399.5 | 534.7 |
| LLDPE | | 14.8 | | | 20.3 | | | 20.4 | | | 43.5 | |

The far superior mechanical results achieved in the present invention by grafting with silane A-1100 at concentration of 2%, have the highest values of stress, strain, energy and modulus, even at 40% filler weight, which foreshow direct economic effects.

EXAMPLE XVII

The Suzorite mica (200 mesh coated), or glass fiber 0.8 mm (coated), was mixed with the linear low density under the explained conditions in example no. VI. The mechanical results are shown on Table no. X.

TABLE X.

| | Experiment | | | | | | | | | | | |
| --- | --- | --- | --- | --- | --- | --- | --- | --- | --- | --- | --- | --- |
| | Energy (KJ) × 10⁵ | | | Strain (%) | | | Stress (MPa) | | | Modulus (MPa) | | |
| Filler (Wt %) | 20 | 30 | 40 | 20 | 30 | 40 | 20 | 30 | 40 | 20 | 30 | 40 |
| Grafted Aspen Pulp "Mesh 60" with 2% Silane A-1100 | 51.3 | 55.9 | 50.4 | 28.6 | 25.6 | 20.4 | 25.9 | 28.6 | 31.4 | 336.9 | 372.0 | 506.0 |
| Mica (Suzorite-200-NP) | 22.2 | 9.5 | 6.7 | 11.8 | 7.1 | 5.3 | 20.1 | 19.7 | 22.0 | 100.5 | 159.3 | 238.7 |
| Glass Fiber (0.8 mm) | 17.1 | 21.2 | 20.9 | 17.1 | 15.3 | 11.2 | 15.2 | 14.2 | 12.2 | 52.8 | 53.7 | 65.1 |

Summary of results presented on Table X. show that the composites of grafted aspen wood pulp with silane A-1100 gave superior mechanical properties comparing with composites of mica or glass fiber. In addition, the price of coated mica or fiber glass is much higher than the costs of the grafted wood fibers subject of the present invention.

EXAMPLE XVIII

Grafted Wood Flour Composites 20 g of dry aspen wood flour (60 Mesh) was soaked for 24 hours in 400 ml of 4% sodium hydroxide to remove some of the lignin, wax and resins present in the wood flour, which inhibit the grafting process. The mixture was filtered, washed and neutralized with 10% acetic acid, then left to dry at 55° C. in a circulating air oven for 48 hours. The grafting with silane A-1100 on that wood flour was carried out as in example no. V. The composite mechanical results are as follows:

| Silane % | Wt % | Stress (MPa) | Strain % | Energy J × 10² | Modulus (MPa) |
| --- | --- | --- | --- | --- | --- |
| 1% | 30 | 25.5 | 13.1 | 33.8 | 162.6 |
| 2% | 30 | 28.3 | 16.0 | 42.1 | 272.9 |

These results are much higher compared to the mechanical properties of linear low density polyethylene.

GRAFTED ASPEN PULP WITH SILANE A-1100-POLYETHYLENE COMPOSITES AT EXTREME TEMPERATURE CONDITIONS

Some of the prepared samples according to examples I–III and to examples VI & X. were measured after applying the following temperature conditions:

EXAMPLE XIX

After boiling in water for 4 hours

The mechanical results after boiling in tap water for 4 hours are indicated on Table XI.

TABLE XI.

| Filler (Wt %) | | Stress (MPa) | Strain % | Energy J × 10² | Modulus (MPa) |
| --- | --- | --- | --- | --- | --- |
| | LLDPE | 16.3 | 16.8 | 20.4 | 66.7 |
| 20 | Grafted Pulp with Silane A-1100 | 23.01 | 22.3 | 39.5 | 104.6 |
| 30 | | 23.6 | 19.6 | 42.7 | 159.9 |
| 40 | | 31.5 | 18.4 | 45.6 | 405.0 |
| 30 | Mica | 15.3 | 7.1 | 9.4 | 113.1 |
| 30 | Glass Fiber | 17.6 | 15.2 | 21.3 | 82.2 |

It is very exciting to see that the silane grafted aspen pulp-polyethylene composites (as examples I–III) remain vertually unaffected by boiling. The samples remained stronger either than polyethylene, mica, or fiber glass.

EXAMPLE XX

After keeping at 105° C. for seven days

TABLE XII.

| Filler (Wt %) | | Stress (MPa) | Strain % | Energy J × 10² | Modulus (MPa) |
| --- | --- | --- | --- | --- | --- |
| | LLDPE | 14.95 | 4.6 | 7.3 | 159.94 |
| 20 | Grafted Pulp with Silane A-1100 | 25.4 | 20.18 | 42.9 | 494.8 |
| 30 | | 29.9 | 17.3 | 42.4 | 566.9 |
| 40 | | 32.2 | 16.4 | 41.8 | 999.45 |
| 30 | Mica | 23.2 | 6.6 | 12.3 | 476.4 |
| 30 | Glass Fiber | 18.4 | 1.9 | 33.9 | 533.9 |

Some improvement occurred in the grafted pulp, comparing with those measured at room temperature, Table IV., could be due to a new chemical attachement caused by the effect of temperature.

EXAMPLE XI

Measuring at −40° C.

The measurements of composite samples were carried out in Instron Environmental Chamber System (Model 3111).

TABLE XIII.

| Filler (Wt %) | | Stress (MPa) | Strain % | Energy J × 10² | Modulus (MPa) |
| --- | --- | --- | --- | --- | --- |
| | LLDPE | 31.24 | 11.32 | 26.5 | 581.8 |
| 20 | Grafted Pulp with Silane A-1100 | 42.7 | 12.1 | 37.6 | 938.1 |
| 30 | | 43.0 | 11.98 | 39.5 | 923.6 |
| 40 | | 47.2 | 11.3 | 39.2 | 1158.1 |
| 30 | Mica | 32.8 | 5.2 | 12.6 | 849.6 |
| 30 | Glass Fiber | 33.2 | 8.7 | 22.1 | 1119.4 |

Finally, the results presented on Table XIII. dealing with composites, behaviour of which at −40° C., show that grafted aspen pulp with silane A-1100 composites do not lose their reinforcing properties even at −40° C. and keep their reinforcing advantages vis-a-vis glass fibers or mica.

The embodiments of the invention, in which an exclusive property or privilege is claimed, are claimed as follows:

1. A process for preparing a reinforced composite material, which comprises providing a filler material selected from the group consisting of chemicalthermomechanical wood pulp derived from aspen, birch or spruce, and wood flour derived from aspen, birch or spruce, providing acetone in a 1:2 weight ratio with respect to said filler material, adding 1–4 weight percent gamma-methacryloxypropyltrimethoxy silane or gamma-amino propyltriethoxy silane, 0.8 weight percent of benzoyl peroxide and 1 weight percent maleic anhydride to said acetone to give an organic solution, spraying said filler material with said organic solution while continuously stirring said filler material, passing a current of warm air over said wetted filler material until there is obtained a grafted filler material, mixing said grafted material with a linear low density polyethylene or isotactic polypropylene on a hot roll-mill or in an extruder to give said reinforced composite material.

2. A process according to claim 1, which comprises mixing said organic filler with an inorganic filler before spraying said filler material with said organic solution.

3. A process according to claim 2, wherein said inorganic filler comprises graphite, carbon powder, metal powder and metallic compounds.

4. A composite material comprising a polymeric substance selected from the group consisting of a linear low density polyethylene or isotactic polypropylene and an organic filler selected from the group consisting of chemicalthermomechanical wood pulp derived from aspen, birch or spruce, and wood flour derived from aspen, birch or spruce, wherein said filler is grafted with 1–4 weight percent gamma-methacryloxypropyltrimethoxy silane or gamma-amino propyltriethoxy silane, 0.8 weight percent of benzoyl peroxide and 1 weight percent maleic anhydride.

5. The composite material of claim 4, which additionally comprises an inorganic filler consisting of graphite, carbon powder, metal powder or metal compounds, mixed or bonded to said organic filler.

6. The composite material of claim 5, wherein said inorganic filler material comprises calcium carbonate.

7. The composite material of claim 4, wherein the filler material comprises 1–99 weight percent based on the total weight of the composite.

* * * * *